Dec. 4, 1923.  
T. PERNIN ET AL  
1,476,217  
HAIRED AND UNHAIRED HIDE STRETCHING, ENSUPPLING, AND TRIMMING MACHINE  
Filed Jan. 12, 1922   3 Sheets-Sheet 1

INVENTORS:  
Théophile Pernin  
and Joseph dit Georges Klotz  
By  
ATTORNEY

Dec. 4, 1923.  1,476,217
T. PERNIN ET AL
HAIRED AND UNHAIRED HIDE STRETCHING, ENSUPPLING, AND TRIMMING MACHINE
Filed Jan. 12, 1922   3 Sheets-Sheet 3
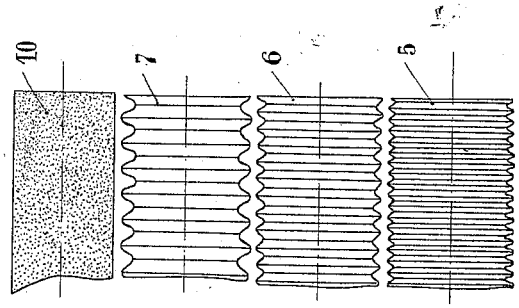
Fig.3.
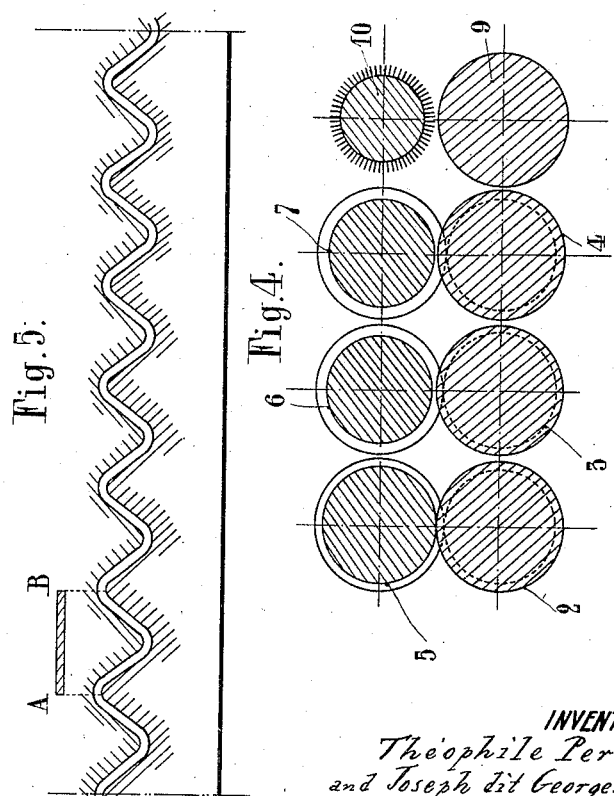
Fig.5.
Fig.4.
INVENTORS:
Théophile Pernin
and Joseph dit Georges Klotz
By
ATTORNEY Patented Dec. 4, 1923.

1,476,217

UNITED STATES PATENT OFFICE.

THÉOPHILE PERNIN AND JOSEPH DIT GEORGES KLOTZ, OF PARIS, FRANCE.

HAIRED AND UNHAIRED HIDE STRETCHING, ENSUPPLING, AND TRIMMING MACHINE.

Application filed January 12, 1922. Serial No. 528,331.

*To all whom it may concern:*

Be it known that we, THÉOPHILE PERNIN, a citizen of the Republic of France, and a resident of Paris, France (post-office address 24 Avenue Philippe Auguste), and JOSEPH DIT GEORGES KLOTZ, a citizen of the Republic of France, and a resident of Paris (post-office address 17 Rue de Longchamps), have invented a new and useful Haired and Unhaired Hide Stretching, Ensuppling, and Trimming Machine, which Improvements are fully set forth in the following specification.

All the devices hitherto generally used in peltry for stretching hides are rather unpractical and as a rule do not give good results.

The object of our invention is to provide a haired and unhaired hide stretching, suppling and trimming machine characterized by the fact that it renders the hides supple and trims them to form, while stretching them to the utmost.

An embodiment of our device is shown as an example by the appended drawing, wherein—

Figure 1:
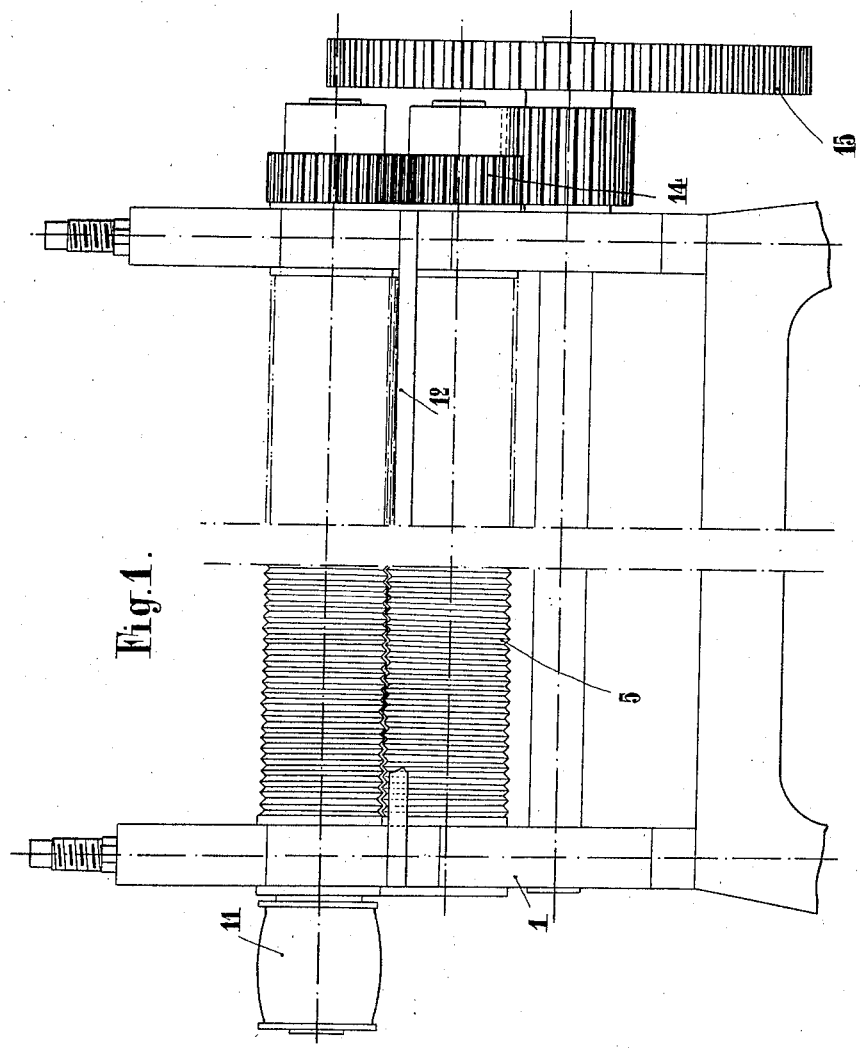
Figure 2:
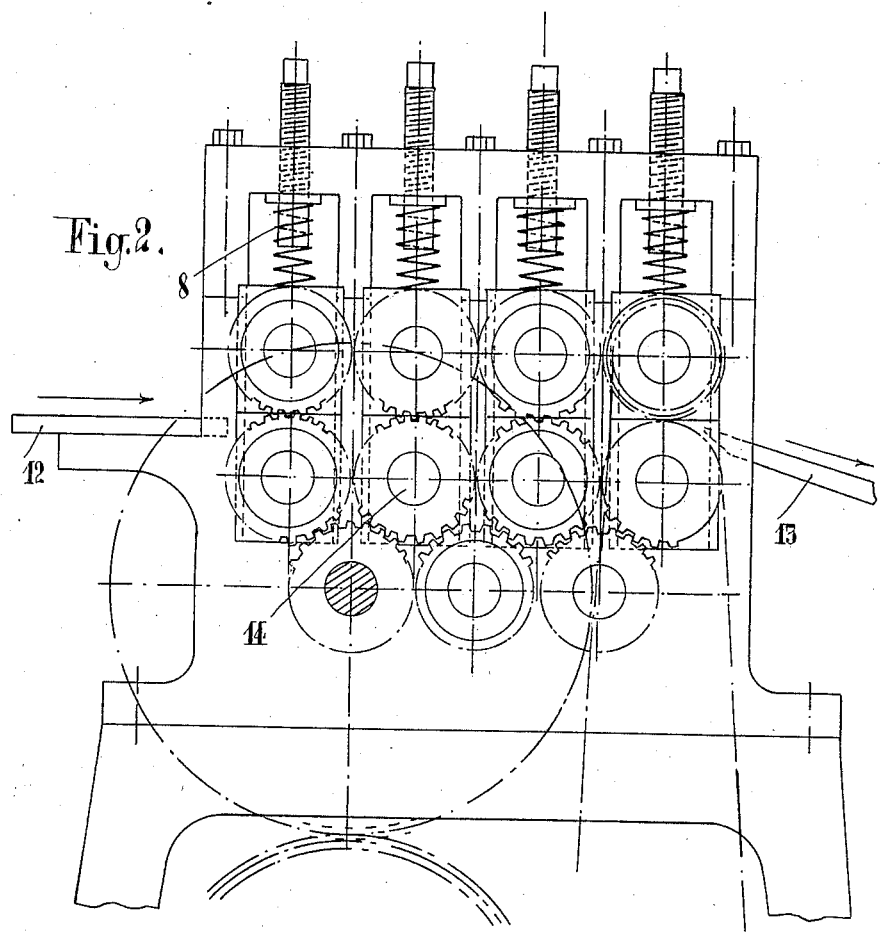

Figure 1 is a front elevation;
Figure 2 is a side elevation;
Figure 3 is a plan view of the rollers and the rotary brush;
Figure 4 is a diagrammatic cross-section view of the rollers and brush;
Figure 5 shows how the grooves and ribs of the various rollers interfit.

Referring to the drawing, it will be seen that the machine consists of a frame 1, on which are mounted a series of rollers 2, 3, 4 . . . provided with grooves and ribs into which register the corresponding ribs and grooves of a second series of rollers 5, 6, 7, suitably arranged above the first set. Contact of these rollers is obtained by means of adjustably set coil springs 8 or by any other means.

Parallelly to roller 4 a smooth roller 9 is arranged and above it is located a cylinder 10 covered by a metallic brush, rotated through a pulley 11. This brush may be replaced by a helicoidally bladed knife.

A table 12 intended to receive the hide to be treated is suitably arranged for this purpose at the front part of the machine, and an inclined chute 13 is provided at the other end of the said machine to receive the stretched hide.

The rollers in the upper row revolve reversely to those in the lower row, so as to feed the hide to be treated. For this purpose, suitably combined gearing 14 is secured on the ends of the various roller axes or spindles. Gear 15 imparts the initial drive which is transmitted by various pinions.

The hide to be worked is placed on table 12 and once the rollers are set in motion, the hide, inserted between the first ones 2 and 5, is automatically fed between the others and comes out on the chute 13 between roller 9 and brush 10.

Supposing a hide of A—B width is seized between the two tops of a groove and rib, it will be apparent that, since the corresponding rib and groove crush it, the said hide will be forced into contact with the wall of the groove over its entire development; its area will therefore be increased. The process being reproduced on the ribs and grooves of all of the ribbed or corrugated rollers, the area of the whole hide cannot but be substantially increased. It is to be observed in this connection that the width of the ribs or corrugations and of the intervening grooves is least in the front rollers 2 and 5 and greatest in the rear or back rollers 4 and 7; the central rollers 3 and 6 having ribs and grooves intermediate in width between those of the front and rear rollers. This arrangement facilitates the stretching action by providing progressively-increasing surface areas against which the hide is stretched as it passes from one pair of rollers to the next, so that the hide is thus progressively or gradually stretched as will be understood.

Of course we have shown the embodiment of our machine illustrated by the appended drawing only as an example, and the constructional features thereof may be altered without departing from the essential characteristics of our invention.

Having now particularly described and ascertained the nature of our said invention and a manner in which the same is to be performed, what we claim is:

A hide stretching and suppling machine, comprising upper and lower series of ribbed and grooved rollers, and gearing for driving them in unison; the ribs of each series of rollers fitting in the grooves of the other series, and the ribs and grooves of the successive pairs of rollers progressively increasing in width from front to rear of the machine, thereby to provide progressively-increasing surface areas against which a hide is stretched as it passes from one pair of rollers to the next, substantially as described.

In testimony whereof we have signed this specification in the presence of a subscribing witness.

THÉOPHILE PERNIN.
JOSEPH DIT GEORGES KLOTZ.

Witness:
CHARLES LEON LOISEL.